United States Patent
Ju et al.

(10) Patent No.: US 10,608,215 B2
(45) Date of Patent: Mar. 31, 2020

(54) CURVED SURFACE-STRUCTURED BATTERY PACK

(71) Applicant: LG CHEM, LTD., Seoul (KR)

(72) Inventors: Jaehyeon Ju, Daejeon (KR); Seog Jin Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 263 days.

(21) Appl. No.: 15/024,505

(22) PCT Filed: Aug. 12, 2014

(86) PCT No.: PCT/KR2014/007477
§ 371 (c)(1),
(2) Date: Mar. 24, 2016

(87) PCT Pub. No.: WO2015/046751
PCT Pub. Date: Apr. 2, 2015

(65) Prior Publication Data
US 2016/0276635 A1     Sep. 22, 2016

(30) Foreign Application Priority Data
Sep. 30, 2013  (KR) .................. 10-2013-0116014

(51) Int. Cl.
| | |
|---|---|
| H01M 2/10 | (2006.01) |
| H01M 2/02 | (2006.01) |
| H01M 2/30 | (2006.01) |
| H01M 2/04 | (2006.01) |
| H01M 2/26 | (2006.01) |
| H01M 10/0525 | (2010.01) |

(52) U.S. Cl.
CPC ....... *H01M 2/1022* (2013.01); *H01M 2/0287* (2013.01); *H01M 2/0456* (2013.01); *H01M 2/26* (2013.01); *H01M 2/30* (2013.01); *H01M 10/0525* (2013.01); *H01M 2002/0205* (2013.01); *H01M 2220/30* (2013.01)

(58) Field of Classification Search
CPC ............. H01M 2/1022; H01M 2/0287; H01M 2/0456; H01M 2/26; H01M 2/30
USPC ......................................................... 429/179
See application file for complete search history.

(56) References Cited

U.S. PATENT DOCUMENTS

| | | |
|---|---|---|
| 5,759,713 A | 6/1998 | DePalma et al. |
| 6,528,203 B1 | 3/2003 | Mitamura |
| 7,732,092 B2 | 6/2010 | Oh |

(Continued)

FOREIGN PATENT DOCUMENTS

| | | |
|---|---|---|
| CN | 1272347 A | 11/2000 |
| CN | 1639886 A | 7/2005 |

(Continued)

OTHER PUBLICATIONS

International Search Report (PCT/ISA/210) issued in PCT/KR2014/007477, dated Dec. 15, 2014.

*Primary Examiner* — Cynthia H Kelly
*Assistant Examiner* — Rashid A Alam
(74) *Attorney, Agent, or Firm* — Birch, Stewart, Kolasch & Birch, LLP (57) ABSTRACT

Disclosed herein is a battery pack including a battery cell having a curved surface and a pack housing having a curved surface, the pack housing having a battery cell receiving space corresponding to the curved surface of the battery cell to prevent occurrence of a spring back phenomenon of the battery cell and to prevent change in curvature of the battery cell due to external impact.

15 Claims, 4 Drawing Sheets

(56) References Cited

U.S. PATENT DOCUMENTS

| | | | |
|---|---|---|---|
| 2003/0017372 A1 | 1/2003 | Probst et al. | |
| 2003/0017390 A1* | 1/2003 | Probst | A61N 1/375 429/176 |
| 2005/0130030 A1 | 6/2005 | Watanabe et al. | |
| 2008/0193838 A1 | 8/2008 | Oh | |
| 2011/0097615 A1 | 4/2011 | Goh et al. | |
| 2012/0121944 A1* | 5/2012 | Yamamoto | B29C 45/14065 429/7 |
| 2012/0183825 A1* | 7/2012 | Lee | H01M 10/0431 429/94 |
| 2013/0017372 A1 | 1/2013 | Mechling et al. | |
| 2013/0171490 A1* | 7/2013 | Rothkopf | H01M 2/0207 429/120 |
| 2013/0224523 A1* | 8/2013 | Nam | H01M 2/1061 429/7 |
| 2014/0090236 A1 | 4/2014 | Goh et al. | |
| 2014/0093762 A1 | 4/2014 | Goh et al. | |
| 2014/0234679 A1* | 8/2014 | Kim | H01M 2/1653 429/94 |

FOREIGN PATENT DOCUMENTS

| | | |
|---|---|---|
| CN | 101147276 A | 3/2008 |
| CN | 101971388 A | 2/2011 |
| EP | 2 251 921 A2 | 11/2010 |
| JP | 2000-48781 A | 2/2000 |
| JP | 2003-45390 A | 2/2003 |
| JP | 2003-123706 A | 4/2003 |
| JP | 2003-187759 A | 7/2003 |
| JP | 2003-257389 A | 9/2003 |
| JP | 2005-150021 A | 6/2005 |
| JP | 2008-535157 A | 8/2008 |
| JP | 2011-70998 A | 4/2011 |
| JP | 2011-517831 A | 6/2011 |
| JP | 2011-222913 A | 11/2011 |
| KR | 10-2009-0097731 A | 9/2009 |
| KR | 10-0918408 B1 | 9/2009 |
| KR | 10-2012-0024108 A | 3/2012 |
| KR | 10-2013-0096816 A | 9/2013 |
| TW | 381779 U | 2/2000 |
| TW | 200832787 A | 8/2008 |
| WO | WO 01/82393 A2 | 11/2001 |

\* cited by examiner

CURVED SURFACE-STRUCTURED BATTERY PACK

TECHNICAL FIELD

The present invention relates to a secondary battery that can be repeatedly charged and discharged and, more particularly, to a lithium secondary battery.

BACKGROUND ART

With remarkable development of information technology (IT), a great variety of portable information communication devices has been popularized. As a result, in the 21$^{st}$ century, we are moving toward a ubiquitous society in which high-quality information service is possible regardless of time and place. Lithium secondary batteries are very important to realize such a ubiquitous society.

In recent years, design of electronic devices has been very important in consumers' choice of products and the electronic devices have been gradually miniaturized and thinned according to consumers' liking. To this end, there is a high necessity for miniaturizing and thinning a lithium secondary battery in order to minimize unnecessary waste of an internal space of each of the electronic devices. In addition, it is necessary for the lithium secondary battery to have various shapes corresponding to shapes of the electronic devices. In recent years, the demand for a curved battery, including a flexible battery, has increased.

In connection with this case, Korean Patent Application Publication No. 2012-0082808 discloses a curved battery. However, Korean Patent Application Publication No. 2012-0082808 only discloses the curved battery mounted in an external electronic device but does not disclose problems caused from the curved battery.

DISCLOSURE

Technical Problem

The inventors of the present application have found that a curved battery has a problem in that a time-dependent spring back phenomenon in which the curved battery returns to a flat state before being curved occurs in the curved battery and, furthermore, a pouch-shaped battery, which exhibits low resistance to external impact, has a problem in that curvature of the pouch-shaped battery is changed due to external impact. These problems lower dimensional stability of the battery with the result that it is not easy to mount the battery in an electronic device.

It is an object of the present invention to provide a curved battery pack with improved dimensional stability that is capable of solving the above conventional problems.

Technical Solution

In accordance with one aspect of the present invention, the above and other objects can be accomplished by the provision of a battery pack including a battery cell having a curved surface and a pack housing having a curved surface, the pack housing having a battery cell receiving space corresponding to the curved surface of the battery cell to prevent occurrence of a spring back phenomenon of the battery cell and to prevent change in curvature of the battery cell due to external impact.

The battery cell may be a pouch-shaped battery cell including an electrolyte, an electrode assembly having a curved stacked surface of a cathode, an anode, and a separator, electrode leads connected to electrode tabs of the electrode assembly, and a battery case having the electrolyte and the electrode assembly received in a receiving part having a curved surface corresponding to the curved surface of the electrode assembly, an opening of the battery case being sealed in a state in which the electrode leads are exposed outward.

The battery case may be made of a laminate sheet including a metal layer and a resin layer. Specifically, the laminate sheet may be an aluminum laminate sheet. The battery case made of the laminate sheet may include a lower case including a depressed receiving part and an outer edge part extending from the receiving part and an upper case coupled to the lower case by thermal bonding. According to circumstances, the upper case may include a depressed receiving part and an outer edge part extending from the receiving part. The upper case and the lower case may be separated from each other. Alternatively, the upper case and the lower case may be partially connected to each other.

The battery case made of the laminate sheet exhibits a higher degree of freedom in shape than a metal can type battery case. However, the battery case made of the laminate sheet exhibits low mechanical strength against external impact and a spring back phenomenon may easily occur in the battery case made of the laminate sheet. In accordance with one aspect of the present invention, the battery pack adopts a curved pack housing having a battery cell receiving space corresponding to the curved surface of the battery cell to prevent occurrence of a spring back phenomenon of the battery cell and to prevent change in curvature of the battery cell due to external impact and exhibiting mechanical strength. The pack housing is a protective member covering the outer circumference of the battery case such that the battery cell has high mechanical strength against external impact. The pack housing may be made of a metal or a high-strength polymer resin.

The receiving part of the battery case may correspond to the receiving part of the finished pouch-shaped battery cell. The region of the battery case at which the opening is sealed may be formed at the outer edge of the receiving part of the finished pouch-shaped battery cell. Hereinafter, the sealed region may be referred to as an outer circumferential sealed portion.

In a non-limiting embodiment, the battery case may have one or more outer circumferential sealed portions bent toward an outer wall of the receiving part. Specifically, the battery case may have one or more outer circumferential sealed portions bent toward an outer wall of the receiving part excluding another outer circumferential sealed portion from which the electrode leads are exposed outward. More specifically, the electrode leads may be bent toward the unbent outer circumferential sealed portion.

In a non-limiting embodiment, the pack housing may include a curved upper plate facing a top of the battery cell, a curved lower plate facing a bottom of the battery cell, and side plates extending from the upper plate or the lower plate to form a curved receiving space while facing side walls of the battery cell, two or more of the side plates being curved.

The side plates extending from the upper plate may extend to the lower plate and the side plates extending from the lower plate may extend to the upper plate. In this case, one or more of the side plates may be flat, at least one of the flat side plates may be provided with an opening, through which the battery cell having the curved surface is inserted. In this case, the upper plate and the lower plate may be coupled to each other and then the battery cell having the curved surface may be slidably coupled into the pack housing through the opening.

In addition, the side plates extending from the upper plate may be connected or coupled to the lower plate and the side plates extending from the lower plate may be connected or coupled to the upper plate. In this case, the battery cell having the curved surface may be mounted in the lower plate and then the upper plate may be coupled to the lower plate such that the battery cell having the curved surface is mounted in the pack housing.

The expression "connected or coupled" used in the above description may mean that the side plates, which are separated from the upper plate or the lower plate, are coupled to the upper plate or the lower plate using fastening members. In addition, the expression "extending" used in the above description may mean that the side plates are integrally formed with the upper plate or the lower plate, for example, by injection molding without using fastening members.

Coupling between the upper plate and the lower plate is not particularly restricted. For example, coupling between the upper plate and the lower plate may be achieved through a bolt fastening structure, a fastening structure using coupling grooves and coupling protrusions, etc., which are well known in the art to which the present invention pertains. In the following description, coupling between the respective plates is not particularly restricted. For example, coupling between the respective plates may be achieved through a bolt fastening structure, a fastening structure using coupling grooves and coupling protrusions, etc., which are well known in the art to which the present invention pertains.

In a non-limiting embodiment, the pack housing may include a curved upper plate facing a top of the battery cell, a curved lower plate facing a bottom of the battery cell, and side plates connected or coupled to the upper plate or the lower plate to form a curved receiving space, the side plates facing side walls of the battery cell, two or more of the side plates being curved. In this case, the side plates may be provided separately from the upper plate or the lower plate and may be coupled to the upper plate and the lower plate using fastening members.

In a non-limiting embodiment, the pack housing may include a first housing including a curved upper plate facing a top of the battery cell and upper side plates extending from the upper plate and coupled to lower side plates to form a curved receiving space, the upper side plates facing side walls of the battery cell, two or more of the upper side plates being curved, and a second housing including a curved lower plate facing a bottom of the battery cell and upper side plates extending from the lower plate and coupled to the upper side plates to form a curved receiving space, the lower side plates facing the side walls of the battery cell, two or more of the lower side plates being curved. In this case, the pack housing may be completed by coupling between the upper side plates of the first housing and the lower side plates of the second housing.

The upper plate and/or the lower plate may be a window frame. In a case in which the upper plate and the lower plate are window frames, it is possible to manufacture a lightweight battery pack, thereby improving energy density per mass.

The battery pack may include one or more upper plates and/or lower plates parallel to a side of the battery cell from which the electrode leads of the battery cell protrude. In addition, the battery pack may include one or more upper plates and/or lower plates parallel to a side of the battery cell adjacent to another side of the battery cell from which the electrode leads of the battery cell protrude. The positions of the sides of the battery cell are decided based on when the battery cell is viewed from above.

The battery pack does not need to include only one kind of upper plate and/or lower plate. For example, the battery pack may include all upper plates and lower plates extending in different directions and the upper plates and the lower plates may intersect. In the above structure, support force of the battery pack is improved, thereby more effectively restraining the spring back phenomenon of the battery cell. The number of the upper plates and/or the lower plates may be decided based on required support force.

In a non-limiting example, the electrode assembly may be a stacked type electrode assembly which includes one or more cathodes, one or more anodes, and one or more separators and in which the cathodes, the anodes, and the separators are stacked such that the separators are disposed respectively between the cathodes and the anodes and one end of each of the cathodes, the anodes, and the separators does not intersect the other end of each of the cathodes, the anodes, and the separators.

In another non-limiting example, the electrode assembly may be a stacked and folded type electrode assembly which includes one or more cathodes, one or more anodes, one or more first separators, and one or more second separators and in which the cathodes, the anodes, the first separators, and the second separators are stacked such that the first separators or the second separators are disposed respectively between the cathodes and the anodes, one end of each of the cathodes, the anodes, and the first separators does not intersect the other end of each of the cathodes, the anodes, and the first separators, the second separators cover sides of electrodes at which electrode tabs are not formed, and one end of each of the second separators intersects the other end of each of the second separators.

In a further non-limiting example, the electrode assembly may be a wound type or jelly-roll type electrode assembly which includes one or more cathodes, one or more anodes, and one or more separators and in which the cathodes, the anodes, and the separators are stacked such that the separators are disposed respectively between the cathodes and the anodes and one end of each of the cathodes, the anodes, and the separators intersects the other end of each of the cathodes, the anodes, and the separators.

Meanwhile, the electrode assembly may include one or more improved electrodes, to one side or opposite sides of each of which a separator is laminated. For example, each of the improved electrodes may be configured to have a structure in which a separator is laminated to one side of a cathode or an anode. In addition, each of the improved electrodes may be configured to have a structure in which separators are laminated to opposite sides of a cathode or opposite sides of an anode. Furthermore, each of the improved electrodes may be configured to have a structure in which a cathode, a separator, and an anode are laminated to one another in a state in which the separator is disposed between the cathode and the anode. In this specification, an example in which a cathode, a separator, and an anode are laminated to one another in a state in which the separator is disposed between the cathode and the anode may be defined as an electrode group.

The outermost electrodes of the electrode group may have the same polarity or different polarities. In a case in which the outermost electrodes of the electrode group have the same polarity, the electrode group may be referred to as an S type electrode group. On the other hand, in a case in which the outermost electrodes of the electrode group have different polarities, the electrode group may be referred to as a D type electrode group. At least one of the outermost electrodes may be laminated to separators while being disposed between the separators.

In addition, each of the improved electrodes may be configured to have a structure in which any one selected from between a cathode and an anode and a separator are included and any one selected from between the cathode and the anode is laminated to the separator. The electrode having the structure as described above may be defined as an electrode element. The electrode element may be configured to have a structure in which any one selected from between a cathode and an anode is disposed between separators and any one selected from between the cathode and the anode is laminated to the separators.

An electrode assembly including a combination of the electrode, the improved electrode, the separator, the electrode group, and the electrode element and configured to have a structure in which the separator is disposed between the cathode and the anode falls into the scope of the present invention.

A method of manufacturing the cathode or the anode may include preparing a binder solution by dispersing or dissolving a binder in a solvent, preparing an electrode slurry by mixing the binder solution, an electrode active material, and a conductive material, coating the electrode slurry on a current collector, drying the electrode, and pressing the electrode to a predetermined thickness.

According to circumstances, the manufacturing method may further include drying the pressed electrode.

Preparation of the binder solution is a process of preparing a binder solution by dispersing or dissolving a binder in a solvent. The binder may be all binders well known in the art to which the present invention pertains. In particular, the binder may be one selected from a group consisting of fluorine resin-based binders such as polyvinylidene fluoride (PVdF) and polytetrafluoroethylene (PTFE), rubber-based binders such as styrene-butadiene rubber, acrylonitrile-butadiene rubber, and styrene-isoprene rubber, cellulose-based binders such as carboxymethylcellulose (CMC), starch, hydroxypropylcellulose, and regenerated cellulose, polyalcohol-based binders, polyolefin-based binders such as polyethylene and polypropylene, polyimide-based binders, polyester-based binders, mussel adhesives, and silane-based binders or a mixture or copolymer of at least two thereof.

The solvent may be selectively used based on the kind of a binder and, for example, be an organic solvent such as isopropyl alcohol, N-methylpyrrolidone (NMP), or acetone, water, or the like. In a concrete embodiment of the present invention, a binder solution for the cathode may be prepared by dispersing or dissolving PVdF in NMP or a binder solution for the anode may be prepared by dispersing or dissolving styrene-butadiene rubber (SBR)/carboxymethyl cellulose (CMC) in water.

The electrode slurry may be prepared by mixing/dispersing an electrode active material and a conductive material in the binder solution. The prepared electrode slurry may be delivered to a storage tank such that the electrode slurry is stored in the storage tank until a coating process is carried out. The electrode slurry may be continuously stirred in the storage tank to prevent the electrode slurry from hardening.

The electrode active material may be a cathode active material or an anode active material.

Specifically, examples of the cathode active material may include, but are not limited to, layered compounds such as lithium cobalt oxide ($LiCoO_2$) and lithium nickel oxide ($LiNiO_2$), or compounds substituted with one or more transition metals; lithium manganese oxides having formula $Li_{1+y}Mn_{2-y}O_4$ where y=0 to 0.33, such as $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; Ni-site type lithium nickel oxides having formula $LiNi_{1-y}M_yO_2$ where M=Co, Mn, Al, Cu, Fe, Mg, B, or Ga and y=0.01 to 0.3; lithium manganese composite oxides having formula $LiMn_{2-y}M_yO_2$ where M=Co, Ni, Fe, Cr, Zn, or Ta and y=0.01 to 0.1 or formula $Li_2Mn_3MO_8$ where M=Fe, Co, Ni, Cu, or Zn; $LiMn_2O_4$ in which some of the Li atoms are substituted with alkaline earth metal ions; disulfide compounds; and $Fe_2(MoO_4)_3$.

Examples of the anode active material may further include carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Groups I, II and III elements, or halogens; $0 \leq x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The conductive material is not particularly limited so long as the conductive material does not cause chemical changes in the battery while exhibiting conductivity. Examples of the conductive material may include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and conductive materials such as polyphenylene derivatives.

As needed, the electrode slurry may further selectively include a filler or the like. The filler is not particularly limited so long as the filler is a fibrous material that does not cause chemical changes in the battery. Examples of the filler include olefin-based polymers such as polyethylene and polypropylene; and fibrous materials such as glass fiber and carbon fiber.

Coating of the electrode slurry is a process of coating the electrode slurry onto a current collector in a predetermined pattern and to a predetermined thickness by passing through a coater head. Coating of the electrode slurry may be performed by distributing the electrode slurry on a current collector and uniformly dispersing the electrode slurry thereon using a doctor blade or the like or by die-casting, comma coating, screen-printing, or the like. In addition, the electrode slurry may be molded on a separate substrate and then laminated to a current collector by pressing or lamination.

The current collector is not particularly limited so long as the current collector does not cause chemical changes in the battery while exhibiting high conductivity. For example, the current collector may be made of copper, stainless steel, aluminum, nickel, titanium, sintered carbon, copper or stainless steel surface-treated with carbon, nickel, titanium, silver, or the like, an aluminum-cadmium alloy, or the like. A cathode current collector may have fine irregularities at a surface thereof to increase adhesion between a cathode active material and the cathode current collector and may be used in any of various forms including films, sheets, foils, nets, porous structures, foams, and non-woven fabrics. Specifically, the cathode current collector may be a current collector containing a metal such as aluminum and an anode current collector may be a current collector containing a metal such as copper. The electrode current collector may be a metal foil such as an aluminum (Al) foil or a copper (Cu) foil.

Drying of the electrode is a process of removing a solvent and moisture in the slurry to dry the slurry coated on the metal current collector. In a concrete embodiment, drying is performed in a vacuum oven at a temperature of 50 to 200° C. for a period of one day or less. The manufacturing method may further include a cooling process after the drying process. The cooling process may be performed by slow cooling to room temperature.

In order to increase capacity density of the electrode on which the coating process has been completed and to enhance adhesion between the current collector and the electrode active material, the electrode may be pressed to a desired thickness by passing through two rolls heated to a high temperature. This process is referred to as a rolling process.

Before passing through the two rolls heated to the high temperature, the electrode may be pre-heated. The pre-heating process is a process of pre-heating the electrode before introduction of the electrode between the two rolls to enhance electrode pressing effects.

The rolled electrode may be dried in a vacuum oven at a temperature of 50 to 200° C., which is a temperature range corresponding to a melting point or higher of a binder, for a period of one day or less. The rolled electrode may be cut to a predetermined length and then dried. After the drying process, a cooling process may further be performed.

As the separator, an insulative thin film having high ion permeability and mechanical strength is used. The separator generally has a pore diameter of 0.01 to 10 μm and a thickness of 5 to 300 μm.

As the separator, sheets or non-woven fabrics, made of an olefin-based polymer such as polypropylene or glass fibers or polyethylene, which have chemical resistance and hydrophobicity, or Kraft paper is used. Examples of commercially available separators include the Celgard series such as Celgard® 2400 and 2300 (available from Hoechest Celanese Corp.), polypropylene separators (available from Ube Industries Ltd. or Pall RAI Co.) and polyethylene series (available from Tonen or Entek).

As the electrolyte, a non-aqueous electrolytic solution containing lithium salt, an organic solid electrolyte, an inorganic solid electrolyte, or the like is used. For example, the non-aqueous electrolytic solution may be an aprotic organic solvent such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydrofuran, 2-methyl tetrahydrofuran, dimethylsulfoxide, 1,3-dioxolane, 4-methyl-1,3-dioxene, diethylether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, or ethyl propionate.

Examples of the organic solid electrolyte may include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte may include nitrides, halides, and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte. Examples of the lithium salt may include LiCl, LiBr, LiI, $LiClO_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. According to circumstances, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), fluoro-propylene carbonate (FPC), or the like.

The battery cell may be a lithium ion polymer battery, a lithium ion battery, or a lithium polymer battery. The structures and components of the lithium ion polymer battery, the lithium ion battery, and the lithium polymer battery are well known in the art to which the present invention pertains and are incorporated herein by reference.

In accordance with another aspect of the present invention, there is provided a device using the battery pack with the above-stated construction as a power source. The device may be selected from a group consisting of a laptop computer, a mobile phone, a portable display player (PDP), a portable multimedia player (PMP), an MP3 player, a digital still camera (DSC), a digital video recorder (DVR), a smart phone, a global positioning system (GPS), and a camcorder.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
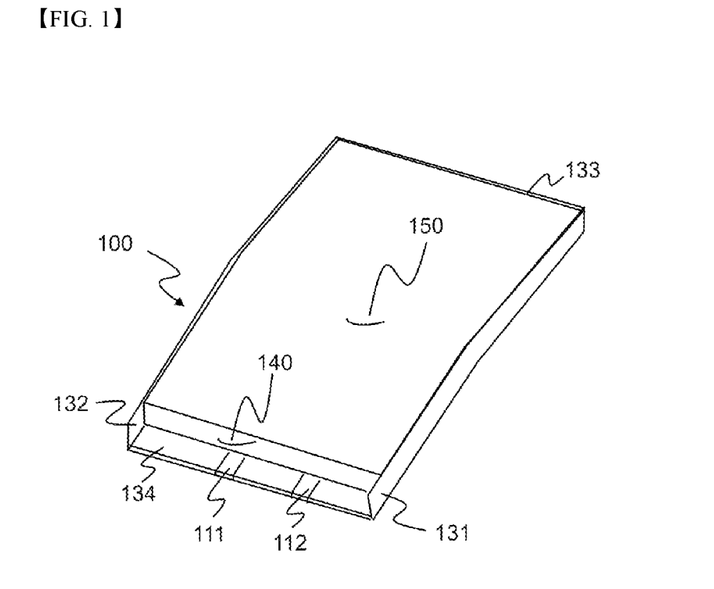
FIG. 1 is a perspective view typically showing a curved battery cell according to a non-limiting embodiment of the present invention.
Figure 2:
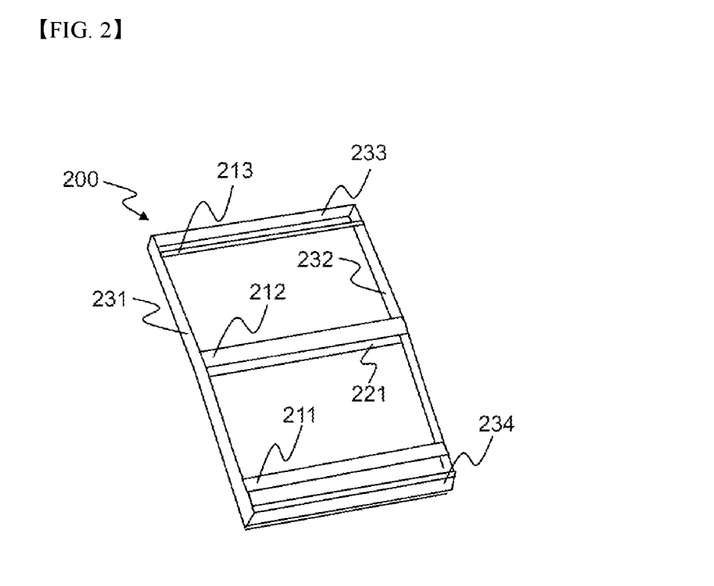
FIG. 2 is a perspective view typically showing a pack housing according to a non-limiting embodiment of the present invention.

FIG. 1 is a perspective view typically showing a curved battery cell according to a non-limiting embodiment of the present invention and FIG. 2 is a perspective view typically showing a pack housing according to a non-limiting embodiment of the present invention.

Referring to FIGS. 1 and 2, a battery cell 100 is completed by sealing an opening in a state in which an electrode assembly is received in a receiving part 150 of a pouch-shaped battery case made of a laminate sheet together with an electrolyte. Of four outer circumferential sealed portions 131, 132, 133, and 134, the three outer circumferential sealed portions 131, 132, and 133 are bent toward a side 140 of the battery cell 100 excluding the outer circumferential sealed portion 134, from which electrode leads 111 and 112 are exposed outward. The electrode leads 111 and 112 are bent toward the outer circumferential sealed portion 134.

A pack includes upper plates 211, 212, and 213 forming a window frame, a lower plate 221 forming a winding frame, and four side plates 231, 232, 233, and 234 extending from the upper plates 211, 212, and 213 and the lower plate 221 or connected to the upper plates 211, 212, and 213 or the lower plate 221. The side plates 231 and 232 each have a curved surface corresponding to a curved structure of the receiving part 150 of the battery cell 100. The side plates 233 and 234 are flat. The side plate 234 may be provided with an opening, through which the battery cell is inserted.

Figure 3:
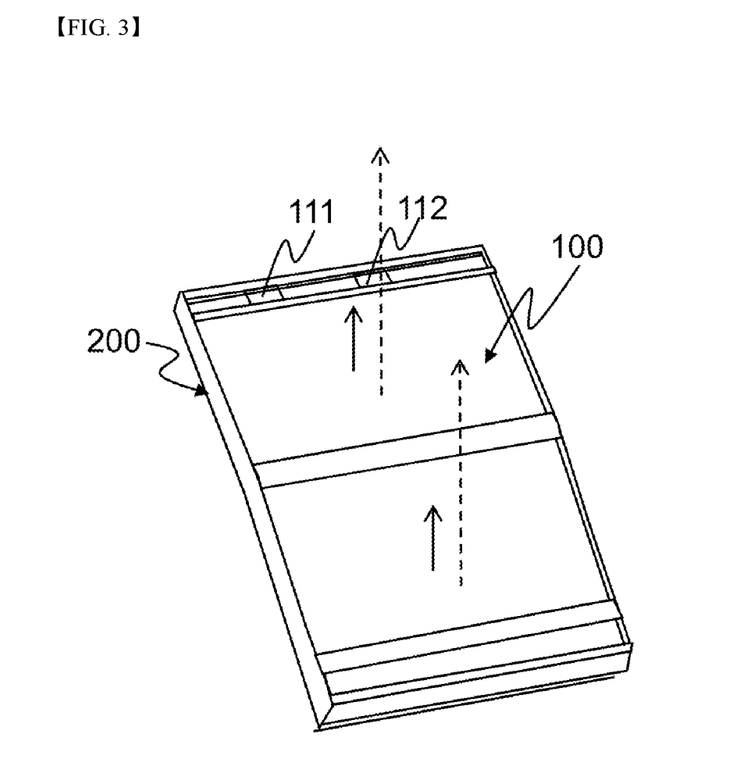
FIG. 3 is a perspective view typically showing a battery pack according to a non-limiting embodiment of the present invention.
Figure 4:
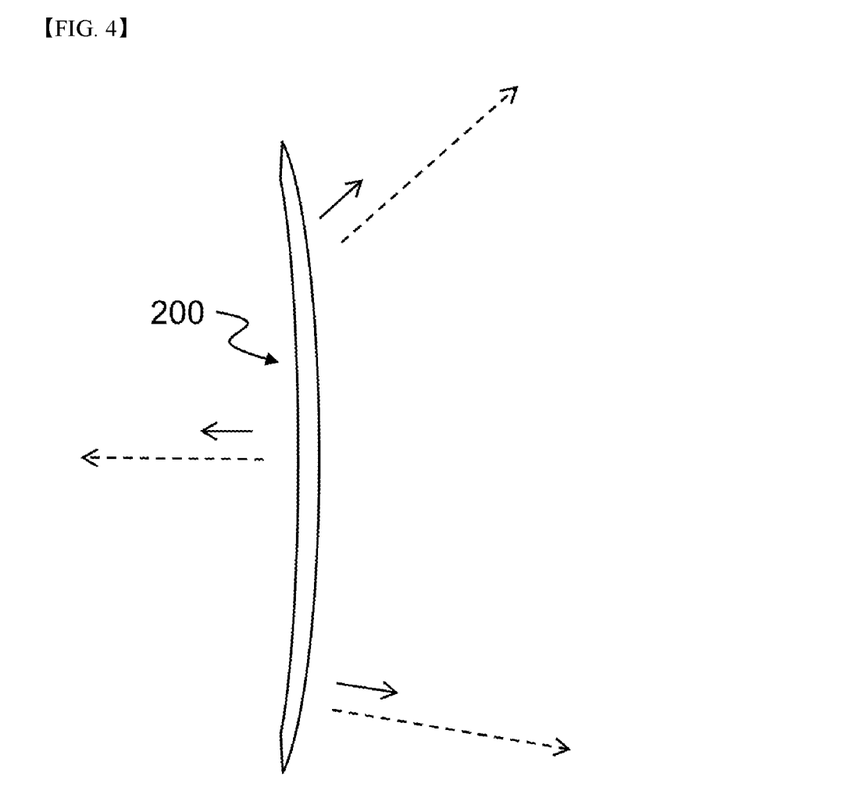
FIG. 4 is a side view showing the battery pack of FIG. 3.

FIG. 3 is a perspective view typically showing a battery pack configured to have a structure in which the battery cell of FIG. 1 is mounted in the pack housing of FIG. 2 and FIG. 4 is a side view typically showing the battery pack of FIG. 3.

Referring to FIGS. 1 to 4, a spring back phenomenon in which the curved battery cell 100 returns to a flat state before being curved in directions indicated by dotted line arrows occurs in the curved battery cell 100. Since the pack housing 200 has a curved battery cell receiving space defined by the curved side plates 231 and 232 corresponding to the curved structure of the battery cell 100 and the flat side plates 233 and 234, however, the pack housing 200 may restrain the spring back phenomenon of the battery cell 100 mounted therein. In FIGS. 3 and 4, solid line arrows are shown exaggeratingly to describe an effect in which the spring back phenomenon having magnitude equivalent to the length of the dotted line arrows is restrained by the pack housing through comparison. In actuality, it should be understood that the spring back phenomenon does not occur through the use of the pack housing.

Figure 5:
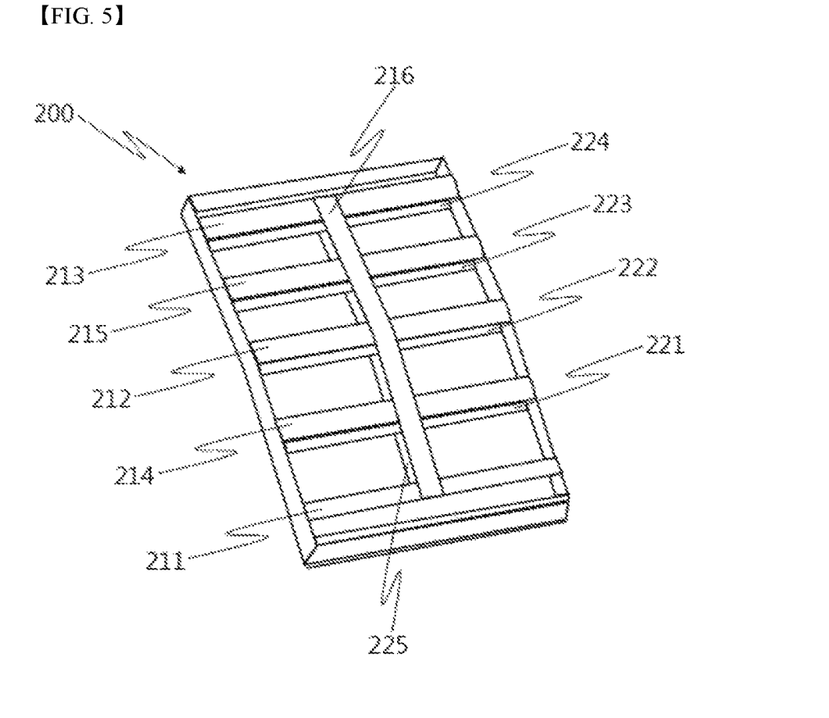
FIG. 5 is a perspective view typically showing a pack housing according to another embodiment of the present invention.

FIG. 5 is a perspective view typically showing a pack housing including upper plates and lower plates extending in different directions according to another non-limiting embodiment of the present invention.

Referring to FIG. 5, a pack housing 200 includes six upper plates 211, 212, 213, 214, 215, and 216 and five lower plates 221, 222, 223, 224, and 225. Specifically, the upper plates 211, 212, 213, 214, and 215, which are parallel to a side of a battery cell from which electrode leads of the battery cell protrude, intersect the upper plate 216, which is parallel to a side of the battery cell adjacent to the side of the battery cell from which the electrode leads of the battery cell protrude.

Similarly, the lower plates 221, 222, 223, and 224, which are parallel to the side of the battery cell from which the electrode leads of the battery cell protrude, intersect the lower plate 225, which is parallel to a side of the battery cell adjacent to the side of the battery cell from which the electrode leads of the battery cell protrude.

In a case in which the six upper plates 211, 212, 213, 214, 215, and 216 and the lower plates 221, 222, 223, 224, and 225 extending in different directions intersect as described above, support force of the pack housing is improved, thereby more effectively restraining the spring back phenomenon of the battery cell.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the present invention has the effect of providing a curved battery pack exhibiting improved dimensional stability.

The invention claimed is:

1. A battery pack comprising: a battery cell having a curved surface; and a pack housing having a curved surface, the pack housing having a battery cell receiving space corresponding to the curved surface of the battery cell and configured to prevent occurrence of a spring back of the battery cell by preventing change in curvature of the battery cell due to external impact, wherein the battery cell comprises: an electrolyte; an electrode assembly having a curved stacked surface of a cathode, an anode, and a separator; electrode leads connected to electrode tabs of the electrode assembly; and a battery case having the electrolyte and the electrode assembly received in a receiving part having a curved surface corresponding to the curved surface of the electrode assembly, an opening of the battery case being sealed in a state in which the electrode leads are exposed outward, wherein the pack housing comprises: a curved upper plate facing a top of the battery cell; a curved lower plate facing a bottom of the battery cell; and side plates connected or coupled to the upper plate or the lower plate to form a curved receiving space, the side plates facing side walls of the battery cell, two or more of the side plates being curved, two of the side plates being flat, one of the flat side plates being provided with an opening, through which the battery cell having the curved surface is inserted, and the battery cell being slidable through the opening to be coupled into the pack housing such that the electrode leads are opposite to another of the two flat side plates, and wherein the curved upper plate and/or the curved lower plate is a window frame.

2. The battery pack according to claim 1, wherein the battery case has one or more outer circumferential sealed portions bent toward an outer wall of the receiving part.

3. The battery pack according to claim 1, wherein the battery case has one or more outer circumferential sealed portions bent toward an outer wall of the receiving part and an unbent outer circumferential sealed portion from which the electrode leads are exposed outward.

4. The battery pack according to claim 3, wherein the electrode leads are bent toward the unbent outer circumferential sealed portion.

5. The battery pack according to claim 1, wherein the battery case is made of a laminate sheet comprising a metal layer and a resin layer.

6. The battery pack according to claim 5, wherein the laminate sheet is an aluminum laminate sheet.

7. A battery pack comprising: a battery cell having a curved surface; and a pack housing having a curved surface, the pack housing having a battery cell receiving space corresponding to the curved surface of the battery cell and configured to prevent occurrence of a spring back of the battery cell by preventing change in curvature of the battery cell due to external impact, wherein the battery cell comprises: an electrolyte; an electrode assembly having a curved stacked surface of a cathode, an anode, and a separator; electrode leads connected to electrode tabs of the electrode assembly; and a battery case having the electrolyte and the electrode assembly received in a receiving part having a curved surface corresponding to the curved surface of the electrode assembly, an opening of the battery case being sealed in a state in which the electrode leads are exposed outward, wherein the pack housing comprises: a curved upper plate facing a top of the battery cell; a curved lower plate facing a bottom of the battery cell; and side plates extending from the upper plate or the lower plate to form a curved receiving space while facing side walls of the battery cell, two or more of the side plates being curved, two of the side plates being flat, one of the flat side plates being provided with an opening, through which the battery cell having the curved surface is inserted, and the battery cell being slidable through the opening to be coupled into the pack housing such that the electrode leads are opposite to another of the two flat side plates, and wherein the curved upper plate and/or the curved lower plate is a window frame.

8. The battery pack according to claim 7, wherein the battery pack comprises one or more upper plates and/or lower plates parallel to a side of the battery cell from which electrode leads of the battery cell protrude.

9. The battery pack according to claim 7, wherein the battery pack comprises one or more upper plates and/or lower plates parallel to a side of the battery cell adjacent to another side of the battery cell from which electrode leads of the battery cell protrude.

10. The battery pack according to claim 7, wherein the side plates extending from the upper plate or the lower plate extend to the lower plate or the upper plate.

11. The battery pack according to claim 1, wherein the pack housing is made of a metal or a polymer resin.

12. A device using a battery pack according to claim 1 as a power source.

13. The device according to claim 12, wherein the device is selected from a group consisting of a laptop computer, a mobile phone, a portable display player (PDP), a portable multimedia player (PMP), an MP3 player, a digital still camera (DSC), a digital video recorder (DVR), a smart phone, a global positioning system (GPS), and a camcorder.

14. The battery pack according to claim 1, wherein the curved surface of the battery cell is an upper curved surface,
wherein the battery cell includes a lower curved surface, and
wherein the upper curved surface and the lower curved surface correspond to the curved upper plate and the curved lower plate battery pack, respectively.

15. The battery pack according to claim 7, wherein the curved surface of the battery cell is an upper curved surface,
wherein the battery cell includes a lower curved surface, and
wherein the upper curved surface and the lower curved surface correspond to the curved upper plate and the curved lower plate battery pack, respectively.

* * * * *